(12) United States Patent
Merler et al.

(10) Patent No.: US 12,346,665 B2
(45) Date of Patent: Jul. 1, 2025

(54) NEURAL ARCHITECTURE SEARCH OF LANGUAGE MODELS USING KNOWLEDGE DISTILLATION

(71) Applicant: International Business Machines Corporation, Armonk, NY (US)

(72) Inventors: Michele Merler, New York City, NY (US); Aashka Trivedi, Cedar Park, TX (US); Rameswar Panda, Medford, MA (US); Bishwaranjan Bhattacharjee, Yorktown Heights, NY (US); Taesun Moon, Scarsdale, NY (US); Avirup Sil, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/670,617

(22) Filed: Feb. 14, 2022

(65) Prior Publication Data
US 2023/0259716 A1    Aug. 17, 2023

(51) Int. Cl.
*G06F 40/40* (2020.01)
*G06N 3/042* (2023.01)

(52) U.S. Cl.
CPC ............ *G06F 40/40* (2020.01); *G06N 3/042* (2023.01)

(58) Field of Classification Search
CPC ................................ G06F 40/40; G06N 3/042
See application file for complete search history.

(56) References Cited

U.S. PATENT DOCUMENTS

| | | |
|---|---|---|
| 11,030,523 B2 | 6/2021 | Zoph et al. |
| 11,030,997 B2 | 6/2021 | Li et al. |
| 2016/0247061 A1 | 8/2016 | Trask et al. |
| 2021/0303967 A1* | 9/2021 | Bender ................... G06N 3/08 |
| 2021/0357752 A1* | 11/2021 | Chen ......................... G06N 3/04 |
| 2022/0019880 A1* | 1/2022 | Dasgupta ................ G06N 3/04 |
| 2022/0076121 A1* | 3/2022 | Choi ...................... G06N 3/063 |
| 2022/0156596 A1* | 5/2022 | Park ....................... G06N 3/045 |
| 2022/0188658 A1* | 6/2022 | Wang ................... G06F 18/214 |
| 2022/0198276 A1* | 6/2022 | Wang ...................... G06F 40/30 |
| 2023/0020886 A1* | 1/2023 | Mahapatra ............... G06N 3/08 |
| 2023/0153577 A1* | 5/2023 | Kim ....................... G06N 3/047 |
| | | 706/27 |
| 2023/0237337 A1* | 7/2023 | Carlucci .................. G06N 5/01 |
| | | 706/20 |

FOREIGN PATENT DOCUMENTS

CN        1111710331 A        9/2020

OTHER PUBLICATIONS

Mukherjee, Subhabrata, and Ahmed Hassan Awadallah. "Distilling bert into simple neural networks with unlabeled transfer data." arXiv preprint arXiv: 1910.01769 (2019). (Year: 2019).*

(Continued)

*Primary Examiner* — Brian L Albertalli
(74) *Attorney, Agent, or Firm* — Anthony Curro

(57) ABSTRACT

A neural architecture search method, system, and computer program product that determines, by a computing device, a best fit language model of a plurality of language models that is a best fit for interpretation of a corpus of natural language and interprets, by the computing device, the corpus of natural language using the best fit language model.

14 Claims, 16 Drawing Sheets

(56) References Cited

OTHER PUBLICATIONS

Zhang, Xiaofan, et al. "Auto Distill: An end-to-end framework to explore and distill hardware-efficient language models." arXiv preprint arXiv:2201.08539 (2022). (Year: 2022).*
Mel, et al. "The NIST Definition of Cloud Computing". Recommendations of the National Institute of Standards and Technology. Nov. 16, 2015.
A. Vaswani, N. Shazeer, N. Parmar, J. Uszkoreit, L. Jones, A. Gomez, L. Kaiser, I. Polosukhin. "Attention Is All You Need", in NeurIPS, 2017.
B. Zoph and Q. V. Le. "Neural architecture search with reinforcement learning", in ICLR, 2017.
Bello et al. "Neural optimizer search with reinforcement learning." International Conference on Machine Learning. PMLR, 2017.
David R. So, Chen Liang, Quoc V. Le. "The Evolved Transformer", ICML, 2019.
G. Prato, E. Charlaix, M. Rezagholizadeh. "Fully Quantized Transformer for Improved Translation", in NeurIPS Workshops, 2019.
Geoffrey Hinton, Oriol Vinyals, Jeff Dean. "Distilling the knowledge in a neural network", in arXiv, 2015.
H. Liu, K. Simonyan, and Y. Yang. "Darts: Differentiable architecture search". arXiv preprint arXiv: 1806.09055, 2018.
J. Xu, X. Tan, R. Luo, K. Song, J. Li, T. Qin, T. Liu, "NAS-BERT: Task-Agnostic and Adaptive-Size BERT Compression with Neural Architecture Search", in AAAI, 2021.
Merity et al., Regularizing and optimizing LSTM language models. arXiv preprint arXiv: 1708.02182 (2017).
Pham et al. "Efficient neural architecture search via parameters sharing." International Conference on Machine Learning. PMLR, 2018.
Pouya Bashivan, Mark Tensen, James J DiCarlo. "Teacher Guided Architecture Search", in CVPR, 2019.
R. Tang, Y. Lu, L. Liu, L. Mou, et al. "Distilling Task-Specific Knowledge from BERT into Simple Neural Networks", in arXiv, 2019.
S. Mukherjee, A. Awadallah, J. Gao. "XtremeDistilTransformers: Task Transfer for Task-agnostic Distillation", in arXiv, 2021.
Subhabrata Mukherjee, Ahmed Awadallah. "XtremeDistil: Multi-stage Distillation for Massive Multilingual Models", in ACL, 2020.
Thomas Elsken, Jan Hendrik Metzen, and Frank Hutter. "Neural architecture search: A survey.", in arXiv, 2018.
V. Sanh, L. Debut, J. Chaumond, T. Wolf. "DistilBERT, a distilled version of BERT: smaller, faster, cheaper and lighter", in NeurIPS 2019.
W. Wang et al. "MiniLM: Deep Self-Attention Distillation for Task-Agnostic Compression of Pre-Trained Transformers", in NeurIPS, 2020.
William Fedus, Barret Zoph, Noam Shazeer. "Switch Transformers: Scaling to Trillion Parameter Models with Simple and Efficient Sparsity", in arXiv, 2021.
Xiaobo Wang. "Teacher Guided Neural Architecture Search for Face Recognition", in AAAI, 2021.
Y. Liu, M. Ott, N. Goyal, J. Du, M. Joshi, D. Chen, O. Levy, et al. "RoBERTa: A Robustly Optimized BERT Pretraining Approach", in arXiv, 2019.
Y. Liu, X. Jia, M. Tan, R. Vemulapalli, Y. Zhu, B. Green, X. Wang. "Search to Distill: Pearls Are Everywhere but Not the Eyes", in CVPR, 2020.
Yu al. "Evaluating the search phase of neural architecture search." ar Xiv preprint arXiv: 1902.08142 (2019).
Zhanghao Wu, Zhijian Liu, Ji Lin, Yujun Lin, Song Han. "Lite Transformer with Long-Short Range Attention", in ICLR, 2020.
Zhiheng Huang, Wei Xu, Kai Yu. "Bidirectional LSTM-CRF Models for Sequence Tagging", in arXiv, 2015.

* cited by examiner search space architecture 201a

FIG. 5

```
Algorithm 1: KD-guided NAS
Result: Best Student Architecture for a given Teacher Model
N ← NUM_GENERATED_ACTIONS;
PrevRewards ← Null;
for episode ← 1 to MAX_EPISODES do
    if episode == 1 then
        CandidateStates = controller.generate_random_states(N) ;
    else
        PredRewards = controller.predict_rewards(AllStates);
        BestStates = sort(AllStates, key = PredRewards);
        if PredRewards == PrevRewards then
            return BestStates[0]
        else
            CandidateStates = BestStates[:N];
            PrevRewards ← PredRewards;
        end
    end
    for i, state in enumerate(CandidateStates) do
        Rewards[i] ← KnowledgeDistillation(Student(state), TEACHER_MODEL);
    end
    controller.train(CandidateStates, Rewards);
end
PredRewards = controller.predict_rewards(AllStates);
BestStates = sort(AllStates, key = PredRewards);
return BestStates[0]
```

FIG. 7

| Parameter | Candidate Values |
|---|---|
| Hidden Layers | [3, 4, 6, 10, 12] |
| Attention Heads | [2, 3, 4, 6, 12] |
| Hidden Size | [192, 288, 384, 576] |
| Intermediate Size | [384, 512, 576, 768, 1024, 1536, 2048, 3072] |
| Hidden Activation | [gelu, relu, silu] |

FIG. 8

| Model | Hidden Layers | Attention Heads | Hidden Size | Intermediate Size | Activation Function | Parameters |
|---|---|---|---|---|---|---|
| NAS_Model1 | 6 | 4 | 288 | 1536 | relu | 16,567,968 |
| NAS_Model2 | 12 | 6 | 288 | 3072 | gelu | 34,527,072 |

FIG. 9

| Seed | Accuracy | Latency (ms) | Reward |
|---|---|---|---|
| 2 | 65.214 | 2.889 | 0.6698 |
| 19 | 65.614 | 3.720 | 0.6636 |
| 42 | 65.579 | 3.176 | 0.6699 |
| $NAS_{Model1}$ | 68.446 | 2.741 | 0.7029 |
| $NAS_{Model2}$ | 68.853 | 5.108 | 0.6812 |

FIG. 10

| Model | Pre-Train Data | Accuracy |
|---|---|---|
| $NAS_{Model1}$ | None | 68.44 |
| $PTNAS_{Model1}$ | Wiki | 76.51 |
| $PTNAS_{Model1}$ | Wiki+BookCorpus | 78.67 |
| $NAS_{Model2}$ | None | 68.85 |
| $PTNAS_{Model2}$ | Wiki | 78.24 |
| $PTNAS_{Model2}$ | Wiki+BookCorpus | 79.13 |

FIG. 11

| Model | Params | Data | # Samples | Accuracy |
|---|---|---|---|---|
| $PTNAS_{Model1}$ | 16.5 | MNLI | 390K | 78.67 |
| $PTNAS_{Model1}$ | 16.5 | MNLI+SNLI | 940K | 82.83 |
| $PTNAS_{Model2}$ | 34.5 | MNLI | 390K | 79.13 |
| $PTNAS_{Model2}$ | 34.5 | MNLI+SNLI | 940K | 83.51 |

FIG. 12

| Model | Parameters | Pretraining Data | Aug. Data | Accuracy | Latency |
|---|---|---|---|---|---|
| Base_Model | 23M | None | MNLI | 67.80 | 2.79 |
| NAS_Model1 | 16M | None | MNLI | 68.44 | 2.74 |
| NAS_Model2 | 34M | None | MNLI | 68.85 | 5.10 |
| PTBase_Model | 23M | Wiki + BookCorpus | MNLI | 78.16 | 3.54 |
| PTNAS_Model1 | 16M | Wiki + BookCorpus | MNLI | 78.67 | 3.36 |
| PTNAS_Model2 | 34M | Wiki + BookCorpus | MNLI | 79.13 | 6.35 |
| PTBase_Model | 23M | Wiki + BookCorpus | MNLI + SNLI | 81.81 | 4.12 |
| PTNAS_Model1 | 16M | Wiki + BookCorpus | MNLI + SNLI | 82.83 | 3.37 |
| PTNAS_Model2 | 34M | Wiki + BookCorpus | MNLI + SNLI | 83.51 | 5.06 |
| Teacher_Model | 109M | Wiki + BookCorpus | MNLI | 84.40 | 7.12 |

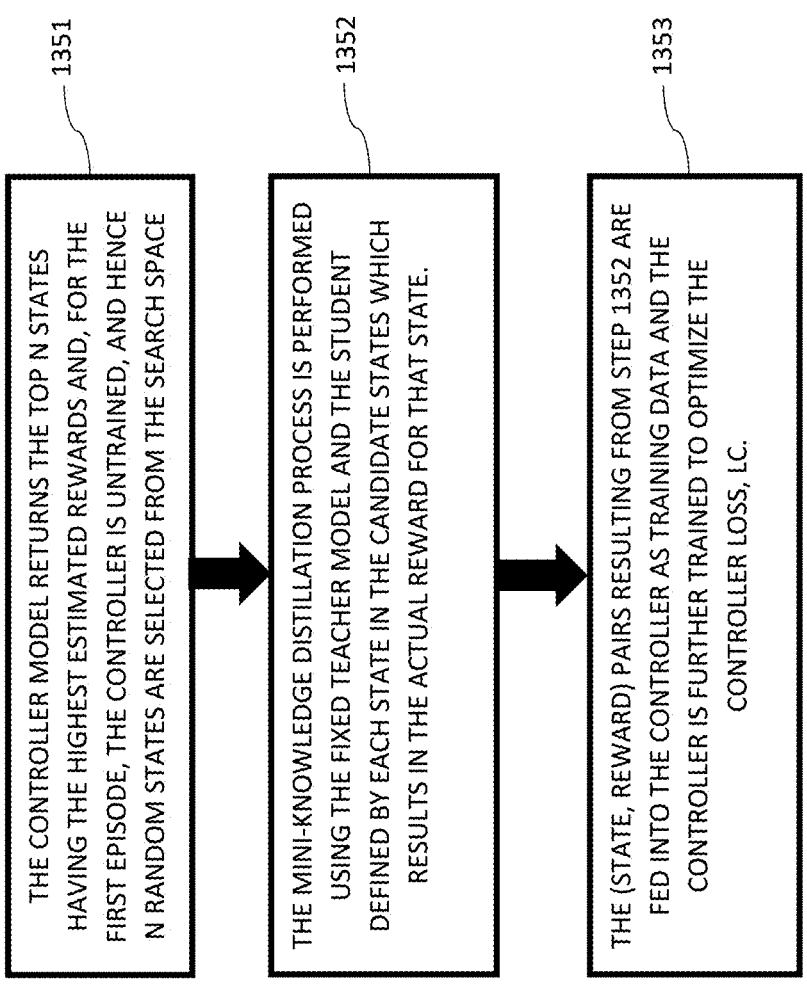

NEURAL ARCHITECTURE SEARCH OF LANGUAGE MODELS USING KNOWLEDGE DISTILLATION

BACKGROUND

The present invention relates generally to a neural architecture search method, and more particularly, but not by way of limitation, to a system, method, and computer program product to perform a neural architecture search of language models to determine a best language model for interpretation of natural language.

Developing effective and efficient models for language understanding is fundamental for several business applications such as document understanding, translation, summarization, question answering, retrieval, search, etc.

Conventionally, the best language models are hand-designed and extremely large (e.g., billions of parameters). These large pretrained language models have achieved state-of-the-art results on a variety of downstream tasks. However, these conventional techniques require large (e.g., huge) amounts of memory to be deployed, and have a large latency for inference, rendering them inefficient to deploy in resource-constrained environments. The smaller models may be more suitable for use in practice, but often sacrifice performance for the sake of deployment. Moreover, these models are ineffective due to their handcrafted architecture design in the space of all possible architectures, and manual selection is likely suboptimal, even if guided by human expertise.

Knowledge Distillation (KD) trains a smaller student model to mimic the behavior of a larger teacher model. This conventional technique may improve an efficiency of current models, making the compressed model suitable for deployment without losing too much of the performance (or knowledge) attained by the larger model. In practice, utilizing an already existing pre-trained student can be immensely beneficial to the distillation process, but this puts a constraint on the architecture of the student. An "optimal" student architecture may exist given a specific teacher model. However, there is no such solution currently in the conventional techniques. Therefore, KD remains ineffective, as the student is manually selected from a set of existing options already pre-trained on large corpora, and thus is a suboptimal choice within the space of all possible student architectures.

Thereby, there is a technical problem in the art that an optimal student architecture currently does not exist, thus leaving the conventional techniques inefficient and/or ineffective.

SUMMARY

In view of the above-mentioned problems in the art, the inventors have considered a technical solution to the technical problem in the conventional techniques by improving a performance of distilling student models whose architecture has not been handcrafted. Specifically, a stage-wise distillation process may be followed, and improvement of the performance of a "base" (i.e., randomly initialized) student is achieved. An additional benefit of using a student that is not handcrafted is the flexibility that it provides in choosing the most optimal architecture for the student, given a teacher model. This leads the inventors to propose the use of a Neural Architecture Search (NAS) as a solution for efficiently automating the process of finding the best architecture optimized for distilling knowledge from a teacher.

Some techniques have combined NAS with either implicit or explicit forms of Knowledge Distillation. However, these techniques have mostly focused on computer vision-specific architectures and not language models. Furthermore, their implementation optimizes NAS with additional forms of model distillation objectives (e.g., mostly internal representation based ones, not predictions-/logits-based ones). In contrast, the inventive method disclosed herein improves distillation (i.e., improves the technology via the novel technique) with NAS (i.e., an improved combination of NAS with KD). Additionally, in these techniques the NAS process is performed on one cell-per-search-episode (e.g., a micro-search level). In contrast, the inventive process herein looks directly at the whole architecture at each episode (e.g., a macro-search level). Indeed, when combined with NAS, this allows to find an architecture that is optimal for a downstream task even when very little training data is available, and with better performance than a simple NAS without KD (or ineffective combined KD).

Accordingly, in view of the technical solutions, the inventors describe herein a technique that improves the NAS process to identify an optimal yet efficient architecture (i.e., suitable for deployment in resource-constrained environments) from a pre-defined search space for a downstream task by combining Knowledge Distillation objectives with the traditional accuracy and latency measures. The invention further improves the performance of the selected model by employing pretraining techniques and/or utilizing data augmentation methods.

In an exemplary embodiment, the present invention can provide a computer-implemented neural architecture search method, the method including determining, by a computing device, a best fit language model of a plurality of language models that is a best fit for interpretation of a corpus of natural language and interpreting, by the computing device, the corpus of natural language using the best fit language model.

In an alternative exemplary embodiment, the present invention can provide a neural architecture search computer program product, the neural architecture search computer program product including a computer-readable storage medium having program instructions embodied therewith, the program instructions executable by a computer to cause the computer to perform determining, by a computing device, a best fit language model of a plurality of language models that is a best fit for interpretation of a corpus of natural language and interpreting, by the computing device, the corpus of natural language using the best fit language model.

In another exemplary embodiment, the present invention can provide a neural architecture search system, said neural architecture search system including a processor; and a memory, the memory storing instructions to cause the processor to perform determining, by a computing device, a best fit language model of a plurality of language models that is a best fit for interpretation of a corpus of natural language and an interpreting, by the computing device, the corpus of natural language using the best fit language model.

In another exemplary embodiment, the best-fit language model may be determined by performing a Knowledge Distillation (KD)-guided Neural Architecture Search (NAS) over the plurality of language models.

In another exemplary embodiment, the KD-guided NAS includes a language model architecture search space for a student model, among which to determine a best configuration, a teacher model used as reference to distill knowledge from using the KD, a reward function to optimize over, based on a combination of factors related to an accuracy for a downstream task, a latency and a KD from the teacher model, a controller module to perform the NAS to guide a selection of states within the language model architecture search space at each stage of an optimization process to maximize an expected reward, and a model training module that measures an actual reward from the states suggested by the controller. The language model architecture search space may be defined to be a set of operations of a language model including deep learning-based models.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 5 exemplarily depicts an 'algorithm 1' that controls the process of the KD-guided NAS process of FIG. 2.

FIG. 7 exemplarily depicts search space candidates for the KD-guided NAS method 100;

FIG. 8 exemplarily depicts data regarding the top two model architectures selected after twenty episodes of the KD-guided NAS method;

FIG. 9 exemplarily depicts results for random sampling, and the two best models of FIG. 8;

FIGS. 10-11 exemplarily depict results of the method 100;

FIG. 12 exemplarily depicts comparative results of the method 100 against conventional techniques;

FIG. 13 exemplarily depicts a controller model training method 1300 according to an embodiment of the present invention;

DETAILED DESCRIPTION

Figure 1:
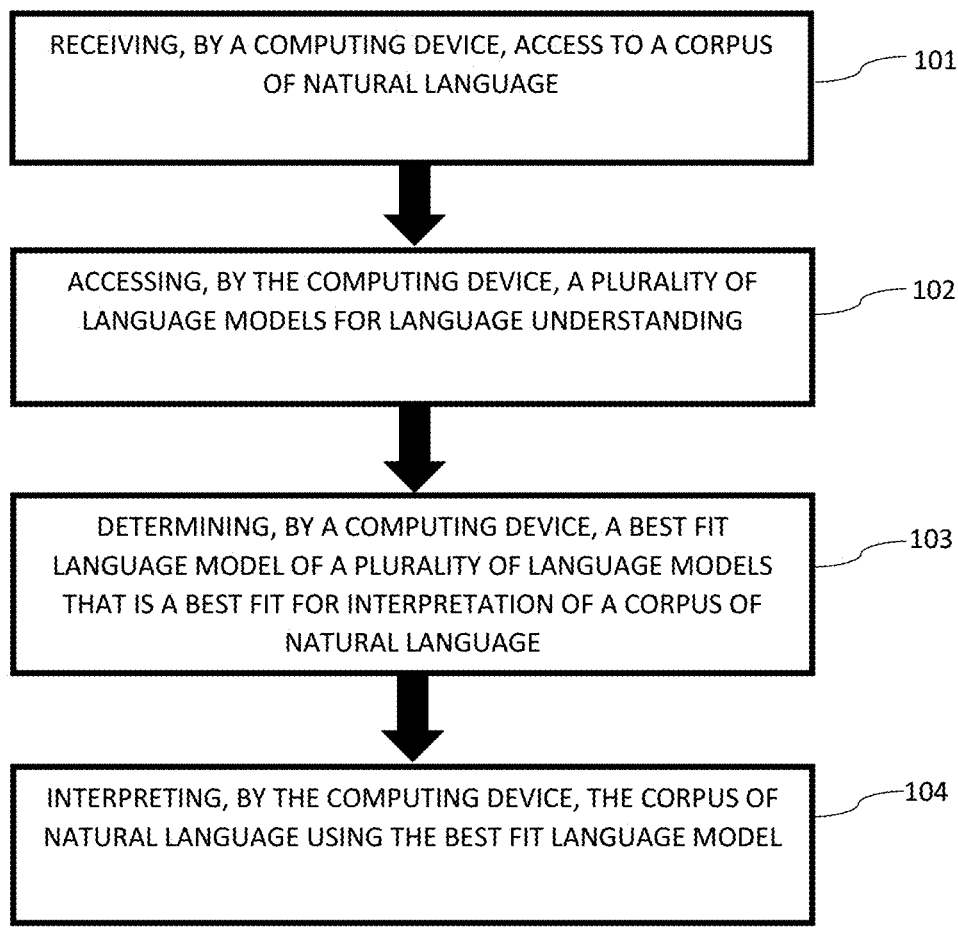
FIG. 1 exemplarily shows a high-level flow chart for a neural architecture search method 100 according to an embodiment of the present invention.

The invention will now be described with reference to FIGS. 1-16, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 6:
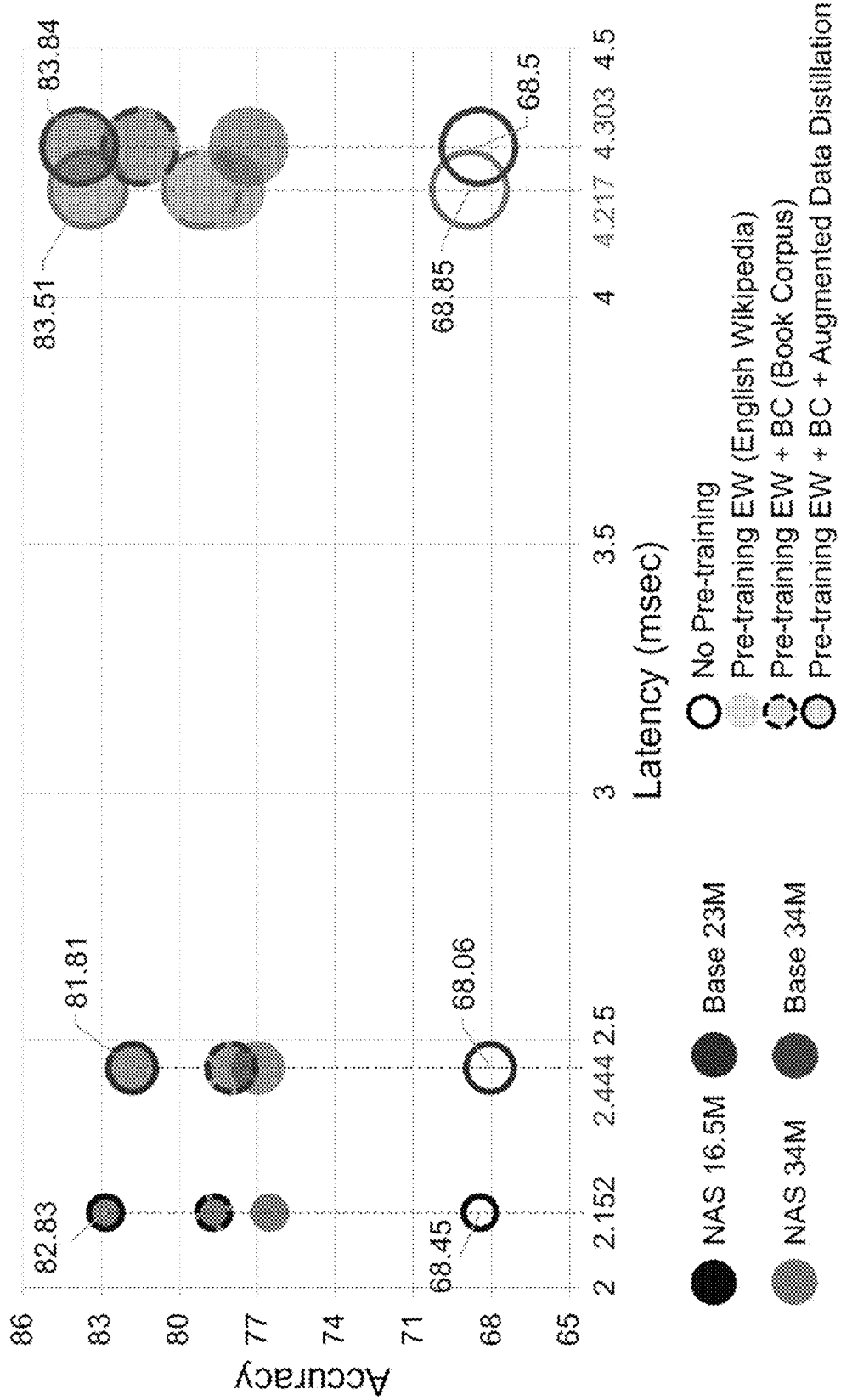
FIG. 6 exemplarily depicts an accuracy of the conventional techniques vs. an accuracy of the method 100.

With reference now to the exemplary method 100 depicted in FIG. 1 and the method 1300 depicted in FIG. 13, the invention includes various steps for a system that improves the NAS process to identify an optimal yet efficient architecture (i.e., suitable for deployment in resource-constrained environments) from a pre-defined search space for a downstream task by combining Knowledge Distillation (KD) objectives with accuracy and latency measures (e.g., such as in FIG. 6 depicting an MNLI Accuracy vs. a latency of NAS-selected architectures compared to hand-selected ones).

Figure 14:
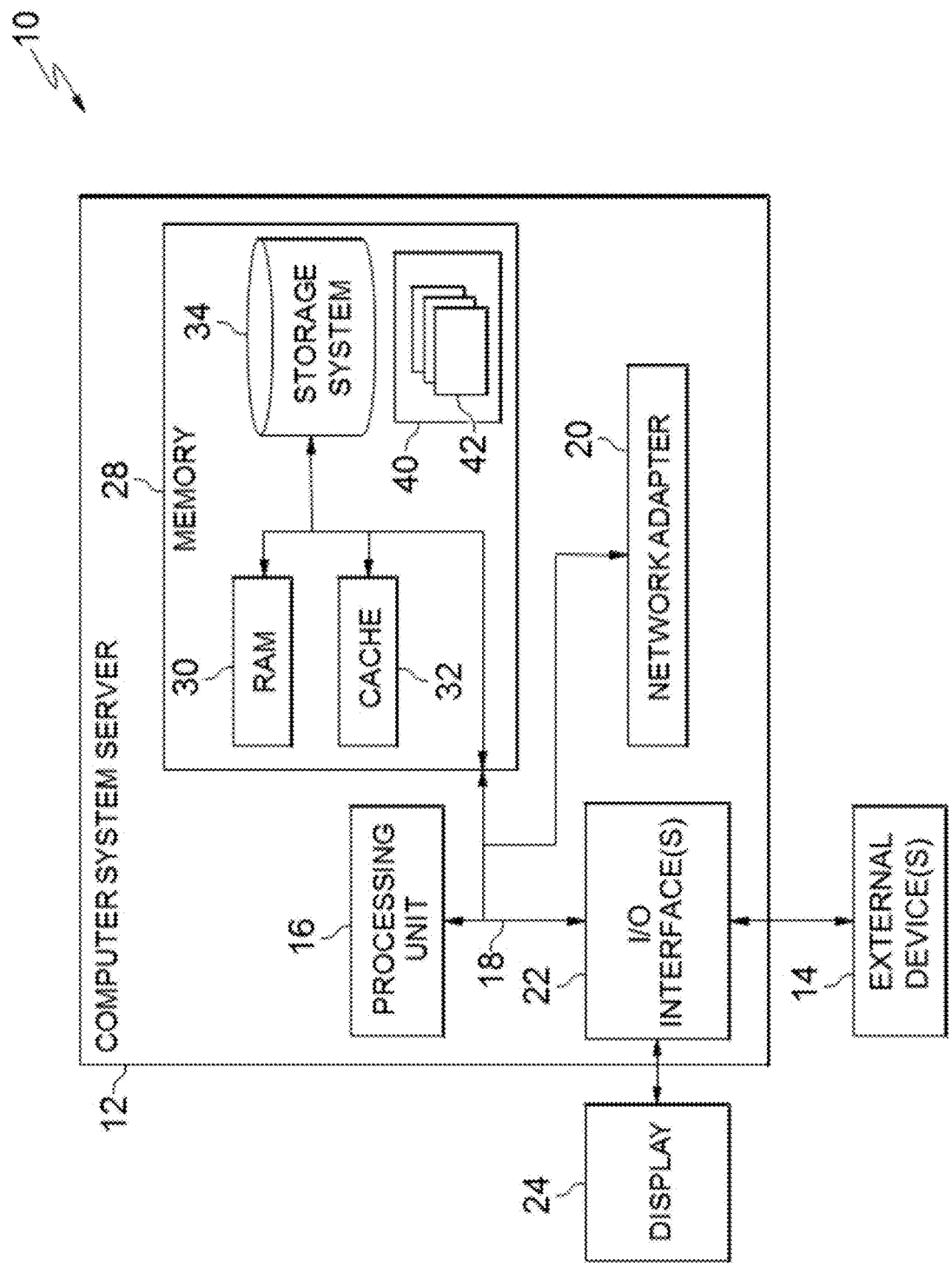
FIG. 14 depicts a cloud computing node 10 according to an embodiment of the present invention.

As shown in at least FIG. 14, one or more computers of a computer system 12 according to an embodiment of the present invention can include a memory 28 having instructions stored in a storage system to perform the steps of FIG. 1.

The neural architecture search method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 14-16) may be implemented in a cloud environment 50 (see e.g., FIG. 15), it is nonetheless understood that the present invention can be implemented outside of the cloud environment.

With reference generally to FIGS. 1-13, the method 100 harnesses the power of a Neural Architecture Search (NAS) to find a best student model architecture to distill knowledge from a bidirectional encoder representations from transformers (BERT) teacher on the Multi-Genre Natural Language Inference (MNLI) task. The inventive Knowledge Distillation (KD)-guided NAS (as described below) produces a student model architecture (i.e., sometimes referred to as 'student') that outperforms non-pre-trained, randomly initialized student model. By pretraining the NAS-selected student architecture, and applying data augmentation techniques, the invention achieves at least a 1% absolute improvement in the accuracy of the pre-trained, hand-crafted student presented in the conventional techniques, and a 15% improvement in accuracy compared to the randomly initialized base student of conventional techniques. Moreover, the best NAS selected model has 30% fewer parameters and a 1.2× speedup in latency compared to the base student model. Using NAS guided by Knowledge Distillation objectives provides the invention with a model architecture that is smaller, faster, and more accurate than manually designed models than conventional techniques.

It is noted that the invention combines KD into NAS such that the NAS is KD-guided (e.g., see Algorithm 1 of FIG. 5).

With specific reference to FIG. 1, the invention achieves the above-described benefits at least via the method 100. In step 101, the invention receives, via a computing device, access to a corpus of natural language. In step 102, the invention may access, via the computing device, a plurality of language models for language understanding.

In step 103, a best-fit language model of a plurality of language models that is a best fit for interpretation of a corpus of natural language is determined, via the computing device. And, in step 104, the corpus of natural language is interpreted, via the computing device, using the best-fit language model.

Referring generally to FIGS. 2-13, KD includes a method of model compression in which the knowledge of a larger teacher model (i.e., sometimes referred to herein as a 'teacher') is transferred to a student model by having the student model learn the teacher's internal representation and logits. Optionally, this may follow a stage-wise distillation technique with gradual unfreezing of student layers (but is not required). The student is optimized on three types of losses, corresponding to three major phases of training of "representation loss", "logit loss", and "cross entropy loss".

The representation loss, $L_{RL}$ shown in equation (1), aims to guide the student to learn the teacher's intermediate representations ($\Psi_T$) on an unlabeled transfer set, $D_u$. The student's internal representations ($\Psi_S$) are projected to the same space as that of the teacher's using non-linear transformations, after which the KL-Divergence (KLD) is computed between them. This loss is optimized in stage one of the distillation process.

$$L_{RL} = \sum_{x_u \in D_u} KLD(\psi_S(x_u), \psi_T(x_u)) \quad (1)$$

It is noted that although KLD is given in this example, other techniques can be used such as Hellinger Distance, Jensen-Shannon divergence, Kolgomonorov-Smirnov statistic, Bhattacharyya distance.

For the logit loss, the teacher model is trained to make predictions by assigning a score (e.g., logits) to all the classes, and then selecting the class with the highest score as the "hard label." Distillation may use the scores of the classes as a way to identify how the teacher tends to generalize, and the logit loss is used to train the student on the target "soft labels" of the teacher logits. The logit loss ($L_{LL}$ of equation (2)) may be calculated as the Mean Squared Error (MSE) of the teacher logits ($\sigma_T$) and the student logits ($\sigma_T$) on the unlabeled transfer set, $D_u$.

$$L_{LL} = \frac{1}{2} \sum_{x_u \in D_u} \|\psi_S(x_u) - \psi_T(x_u)\|^2 \quad (2)$$

It is noted that although MSE is provided as one example, other techniques may be used for logit loss such as L1, Cauchy, LMLS.

For the cross entropy loss, the cross entropy loss is the student's loss that aids it to learn the downstream task. Calculated on data labelled with the ground truth, $D_l$, this allows the student to be fine-tuned on the specific task at hand. The cross-entropy loss ($L_{CE}$ as shown in equation (3)) is calculated between the ground truth labels, y, and the predicted label y^, which is computed using the hidden representation of the student, h, and the student model weights, $\theta_S$. In this work, the MNLI task is presented in a GLUE dataset (i.e., from a database in the Glue Data Catalog which is a container that holds tables).

$$L_{CE} = - \sum_{x_1, y_1 \in D_l} y_1 \cdot \log(\text{softmax}(h(x_l) \cdot \theta_s)) \quad (3)$$

It is noted that classification loss is not limited to the above cross-entropy function to calculate but can also be calculated using MSE, L1, Negative Log Likelihood, Hinge embedding.

Figure 2:
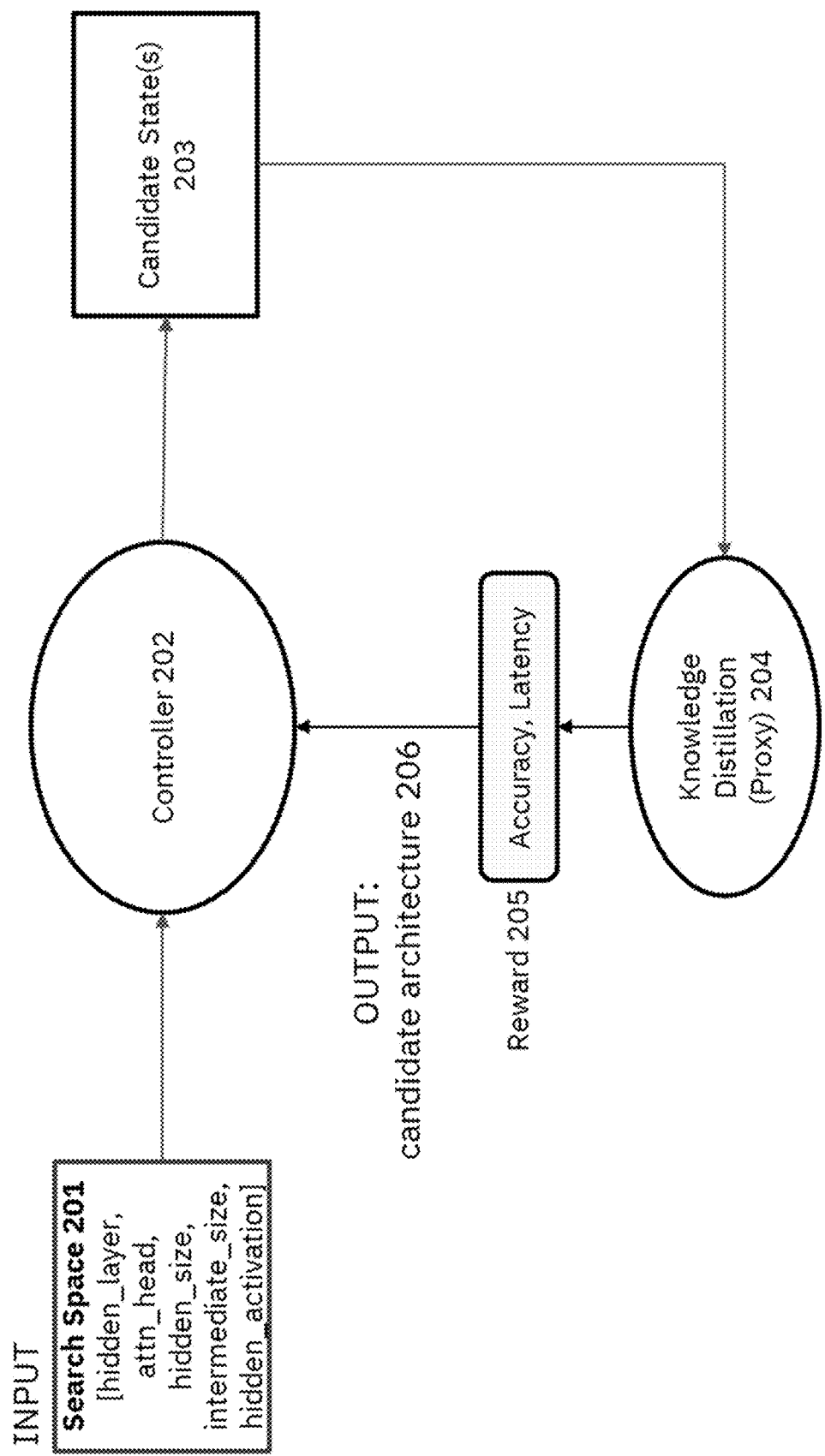
FIG. 2 exemplarily depicts a flowchart for a KD-guided NAS process according to an embodiment of the present invention.
Figure 3:
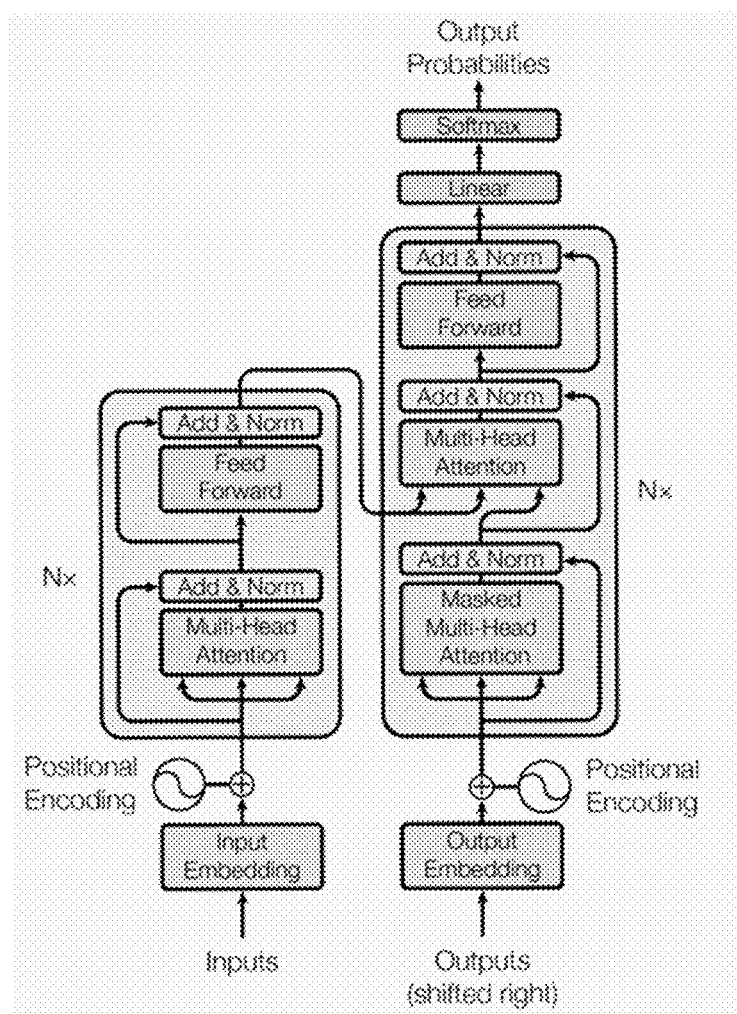
FIG. 3 exemplarily depicts a search space architecture 201*a* of the KD-guided NAS process of FIG. 2.
Figure 4:
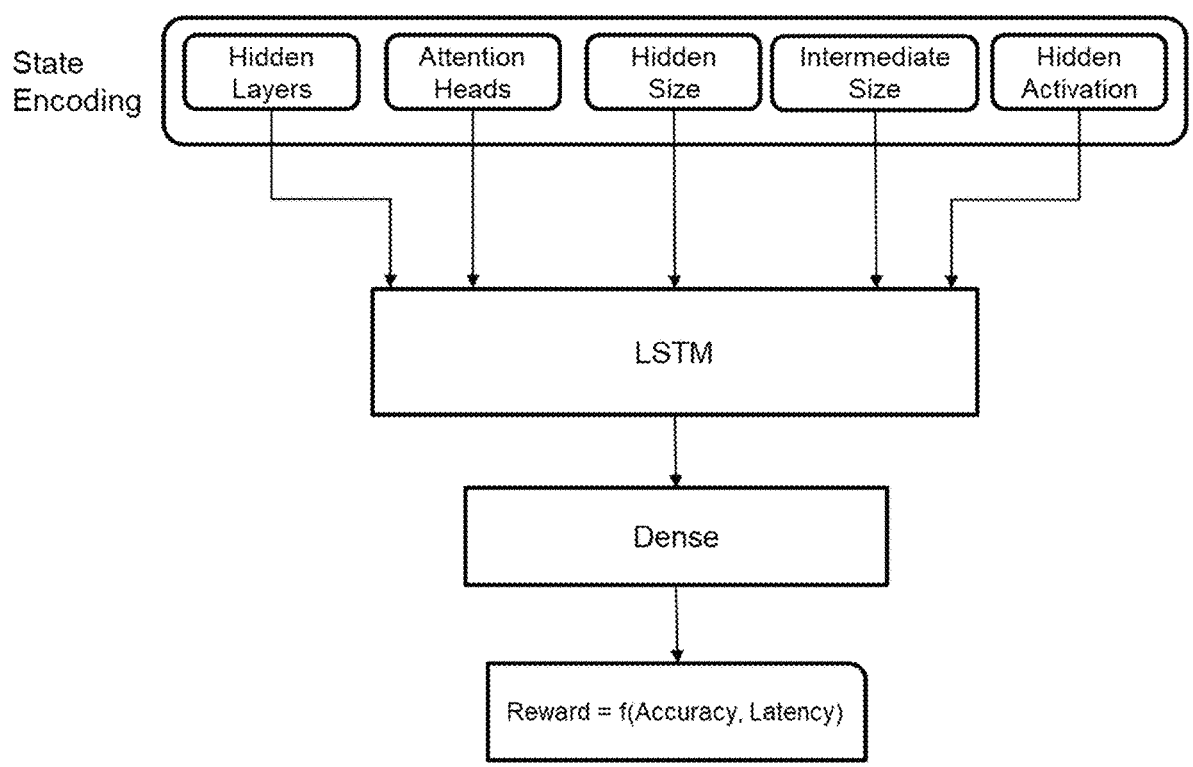
FIG. 4 exemplarily depicts a controller example of the KD-guided NAS process of FIG. 2.

Neural Architecture Search (NAS) includes a method of automating the process of selecting the best candidate architecture from a given search space (e.g., as depicted in FIGS. 2-4). The main components of a NAS algorithm (e.g., as shown in FIG. 5) are a search space, a search strategy, and a performance evaluation.

The search space includes a space defining the set of possible candidate architectures. For a transformer model, the search space may enclose dimensions such as a number of hidden layers, a number of attention heads, hidden size, etc. One goal of NAS is to obtain an architecture that performs better than a random sampling of architectures from this search space.

For the search strategy, the defined strategy to search the search space is what makes NAS much more efficient than a brute-force search of the space. Typically the search space of possible architectures is extremely large, making it practically impossible to test all possible solutions via a brute force approach, and extremely unlikely that a hand-picked solution is the optimal one within the space. NAS allows to perform search within the space in a tractable manner, finding the optimal solution without having to test all possible architectures. NAS typically employs algorithms such as Reinforcement Learning, Differential Search, etc. in order to optimize the searching process over a large, multi-dimensional search space.

For performance evaluation, the NAS algorithm estimates the performance of a candidate model on the given task. A naive performance evaluation strategy is to consider a performance metric after training the candidate architecture on the entire target pipeline. This is extremely computationally expensive, and especially for large language tasks or knowledge distillation pipelines, it is more prudent to lower this resource expense by conducting only a part of the training on a "proxy set" (i.e., a reduced version of the target task or the full dataset, for a limited number of epochs). The selection of the proxy set must be done so that it is representative of the performance on the entire model pipeline.

Most NAS algorithms optimize on the accuracy of the given task, and sometimes the latency. However, the NAS algorithms usually search for models in a completely isolated fashion and the NAS algorithms do not optimize for information from other existing models in their search process.

The method 100 includes a non-trivially adopted NAS to optimize for the KD objective, thus transferring the knowledge from a large model into an optimal architecture for a given task(s) within a large search space. In other words, the invention combines the NAS and KD techniques together to obtain a better result.

Specifically, the invention conducts NAS guided by KD to obtain the best student model architecture, using a BERT Base as the teacher and MNLI as the target task.

Essentially, one exemplary goal is to use NAS to obtain the optimal student architecture for distilling from a BERT teacher, and then use pre-training and/or data augmentation to improve performance.

Thereby, the invention includes a Multi-Layer Perceptron (MLP)-based controller model that determines the next states to be explored by predicting the rewards of the given state, which is a contrast from the probabilistic actor-critic agent proposed in previous work.

The inventive use of the KD-guided NAS process of method 100 aims at using NAS to find the most optimum student model for the KD process, given a teacher model and a downstream task. As follows, the details of the NAS implementation are described below, specifically, the design of the search space, the performance evaluation mechanism, and the search strategy.

Regarding the inventive design of the search space of method 100, method 100 defines a five-dimensional search space for the student transformer model, with the following parameters: "Number of Hidden Layers", "Number of Attention Heads", "Hidden Size", "Intermediate (FFN) Size", and "Hidden Activation Function". The candidates for each of these dimensions have been listed in FIG. 7. The total number of possible student architectures in this search space is (5*5*4*8*3)=2400. This exemplary search space of FIG. 7 is shown in FIG. 3 as the architecture 201a thereof.

It is noted that the search space does not necessarily need to be limited to the five dimensions mentioned above or of transformers architectures, but could include any component of a language model architecture, for example parameters of a (Bi)LSTM, word embeddings such as Glove, etc.

With regards to the performance evaluation system, to estimate the rewards 205, each candidate student model is trained to optimize KD (for example, using representation loss (KL-Divergence), logits loss (MSE)) from the fixed teacher model, and accuracy (Cross Entropy Loss)) on a "proxy" set or process, that is, a reduced version of the target task full dataset, for a limited number of epochs. For the proxy set, a mini-KD process is defined (e.g., such as used later in FIG. 13 step 1352), in which each stage of the process is only fifteen epochs long, done with 40% of the training data. This reduces the time to distill each student to approximately three hours and twenty minutes on a single v100 GPU, thereby allowing for a practical method of evaluating multiple candidate architectures.

With regard to the search strategy, method 100 implements a reinforcement learning-based approach for NAS. For a reinforcement learning problem, there exists two key components: a controller 202 and a reward 205 (e.g., see FIGS. 2-4). The controller 202 includes a machine-learning model that "predicts" the best state (e.g., see architecture in FIGS. 2 and 4).

A Multi-Layer Perceptron (MLP) Controller model is trained to predict the reward of a given state (e.g., see FIG. 4). Alternatively, a Long Short-Term Memory (LSTM) model may be used as a controller 202.

Here, the reward includes a function (e.g., see equations (4a), (4b) and (5)) of the accuracy of the distilled student model ($DS_s$) on the downstream task G after it has been distilled from a teacher model T, and latency of the student model $S_s$, whose architecture is defined by the state$_s$. The latency is normalized using the maximum target latency, which is a percentage of the latency of the teacher. The reward 205 is defined numerically as an optimization goal.

$$DS_i = distil_G(S_i, T) = \omega_R RL(\Psi_{Si}, \Psi_T) + \omega_L LL(\sigma_{Si}, \sigma_T) + \omega_C CE(\theta_{Si}) \quad (4a)$$

$$reward\ (S_s) = acc_G(DS_s) * \left(\frac{lat(Ss)}{max\_lat}\right)^\alpha \quad (4b)$$

$$max\_lat = \beta * lat(T) \quad (5)$$

It is noted that the representation loss may be defined by $\omega_R RL(\Psi_{Si}, \Psi_T)$ and is the representation loss on intermediate features $\Psi$ (KL divergence), unsupervised. The logit loss on prediction logits $\sigma$ (MSE), unsupervised may be defined as the $\omega_L LL(\sigma_{Si}, \sigma_T)$ term, and the cross-entropy loss, back propagated to all weights of student model $\theta_{Si}$, supervised is the $\omega_C CE(\theta_{Si})$ term. In other words, equations (1)-(3) can be alternately defined such as in equation (4a).

It is noted that, in equation 4a, each model student $S_i$ is trained on the downstream task G via distillation from the teacher T and fine-tuning on the task. The reward 205 is a combination of accuracy (computed on the downstream task G) and latency. And, $\omega_R$, $\omega_L$, $\omega_c$, $\alpha$, and $\beta$ are hyperparameters that can be optimized via cross validation while additional constraints can be placed on the size of the student (i.e., a number of parameters).

The maximum latency is 60% of the latency of the teacher (i.e., $\beta=0.6$), and the hyperparameter $\alpha$ is set to −0.06.

The controller model is trained for a certain number of Episodes via controller model training method 1300 of FIG. 13.

In step 1351, candidate states are generated by the controller model returning the top 'N' states having a greatest estimated number of rewards. For the first episode, the controller is untrained, and hence 'N' random states are selected from the search space.

In step 1352, KD 204 is performed on the candidate states via a mini-Knowledge Distillation process, as defined above, using a fixed teacher model and a student defined by each state in the candidate states. This provides an actual reward for that state.

Then, in step 1353, the controller model is trained. The (state, reward) pairs resulting from Step 1352 are fed into the controller 202 as training data and the controller 202 is further trained to optimize the controller loss ($L_C$) of equation (6). This loss measures the mean squared error (MSE) between the actual reward of the model after distillation on the proxy set, $R(DS_s)$, and the predicted reward $PR(_s)$ for all states s belonging to the candidate states CS 203 of that episode.

$$L_C = \frac{1}{2} \sum_{s \in CS} \|R(DS_s) - PR(s)\|^2 \quad (6)$$

Steps 1351-1353 are repeated for 'M' episodes, after which the final student architecture (i.e., candidate architecture 206) selected by the controller 202 is the one with the highest expected reward. The working is described in Algorithm 1 of FIG. 5.

Unlike conventional techniques that place a constraint on only the latency, the invention KD-guided NAS approach of method 100 also puts a constraint on the size of the student. Since a goal of the invention is to use NAS in order to improve the KD process, this constraint is a technical improvement in the art that makes more sense to limit the student to have less than half the number of parameters than the teacher model. To this extent, the KD process is modified to set the reward of students having more parameters than the aforementioned limit to zero.

Thereby, via the inventive method 100, the invention may automate the process of finding a best architecture for a task (NAS) by jointly optimizing for accuracy, latency and knowledge distillation from a teacher model.

The invention may further define the set of candidate architectures (e.g., several thousands) by a search space across multiple dimensions. The invention employs reinforcement learning to train a controller to learn how to choose a candidate architecture that maximizes a reward. The reward is a measure of the performance of a student model on the downstream task, in terms of both accuracy and efficiency.

As discussed above in FIG. 13, the controller may be trained for number of episodes. Each episode includes generating candidates where the controller returns the top N (e.g., a small number, for example 40) candidate student architectures as the ones having the highest estimated rewards, measuring rewards where each candidate student model is trained to optimize knowledge distillation from the fixed teacher model and accuracy on a "proxy set", that is, a reduced version of the target task full dataset, for a limited number of epochs, and updating the controller where the measured rewards are compared against the ones predicted by the controller and the controller weights are updated following back-propagation using MSE loss. The process concludes after M episodes, and the final student architecture is selected by the controller.

Accordingly, the methods 100 and 1300 may determine a best-fit language model by performing a Knowledge Distillation (KD)-guided Neural Architecture Search (NAS) over the plurality of language models. The KD-guided NAS includes a language model architecture search space for a student model, among which to determine a best configuration, a teacher model used as reference to distill knowledge from using the KD, a reward function to optimize over, based on a combination of factors related to an accuracy for a downstream task, a latency and a KD from the teacher model, a controller module to perform the NAS to guide a selection of states within the language model architecture search space at each stage of an optimization process to maximize an expected reward, and a model training module that measures an actual reward from the states suggested by the controller.

The controller may include a non-recurrent machine-learning model that does not take past states into consideration when computing the reward function at any given episode. Or, the controller may include a recurrent machine-learning model that considers one or more past states when computing the reward function at any given episode. The model-training module may select a subset of data as a proxy set to perform training, and utilize early stopping criteria to improve an overall efficiency of the search phase of the KD-guided NAS process.

The language model architecture search space may be defined to be a set of operations of a language model including deep learning-based models. The student model and the teacher model may have a same set of operations or a different set of operations. The teacher model is a much larger model in size than the student model.

The teacher model includes a language model, pre-trained on a text corpora. The reward function includes a weighted combination of an accuracy on the downstream task, the latency and the KD from the teacher model.

The knowledge is distilled from the teacher model via one of or a combination of an unsupervised manner via intermediate features similarity and a supervised manner via logits similarity. And, a measure of a similarity between the teacher model and the student model includes a statistical measure of a distance between vectors. A term related to a number of model parameters may be added to the reward function and a measure and a weight of the latency may be hardware-specific.

Accordingly, the inventive techniques herein are crucial to deploy high performing language models in resource-constrained environments, including the hybrid cloud. Also, while current models require specific costly hardware (e.g., GPUs) in order to run with acceptable inference time, the models resulting from this inventive technique may be able to run on a CPU while retaining comparable accuracy.

Via the embodiment described above, the invention allows to flexibly determine an architecture that is optimal for a given task, and also to retain the accuracy of the teacher model. Indeed, conventional techniques have no knowledge distillation from a teacher model to a student one, nor a neural architecture search component guided by the KD process. KD in combination with NAS of the invention herein allows generation of a new model which is smaller and faster than the original (teacher), with the optimal architecture to perform the downstream task and retain the teacher's accuracy.

Experimental Results

This 'experimental results' section outlines the experiments conducted to choose the proxy set for the NAS process, along with the initial results of the KD-guided NAS. The results empirically study two methodologies that intuitively may improve the model selected by NAS: firstly, pretraining the model using a standard language modeling (LM) objective pre-distillation, and secondly, data augmentation during distillation. Finally, the value added by NAS to the distillation process is examined. It is noted that both masked language modeling and next-sentence prediction are tested as part of the LM task.

An aspect of the efficiency of the NAS process is the use of a proxy set to estimate the performance in a computationally-reduced setting, instead of measuring the performance on the actual, more time- and resource-consuming pipeline. The invention experimented with two proxy sets 'MiniKD$_1$', which ran the conventional process with 30% of the training data, and allowed each distillation stage to run for 10 epochs, and 'MiniKD$_2$', which ran the conventional process with 40% of the training data, allowing each distillation stage to run for up to 15 epochs. MiniKD$_1$ was faster, taking only 2 hours on a single NVIDIA V100 GPU, but MiniKD$_2$ gave a more accurate estimation of the relative rewards of different model configurations compared to their rewards after running the entire conventional process. MiniKD$_2$ is thus taken as the proxy set (or, process) to evaluate the candidate architectures in the invention of method 100 using the NAS implementation.

The inventors performed a KD-guided NAS to find the best student architecture for distilling from a BERT-base teacher. The inventors chose MNLI from the GLUE benchmark as a fine-tuning objective and report the invention's accuracy on the developer set. After performing the KD-Guided NAS for twenty episodes using the proxy set as an estimation of accuracy and latency, the inventors in the experiment obtained the top two models, as suggested by the NAS process, NAS$_{Model1}$, and NAS$_{Model2}$. The configurations are shown in FIG. 8.

In order to evaluate the potency of the NAS system of method 100, the inventors first determined whether the system does better than random sampling. The average accuracy, latency, and rewards after the distillation of five randomly selected student architectures over three seeds have been shown in FIG. 9.

As seen, the best-selected model after twenty episodes of NAS, outperforms the random sampling models in terms of accuracy and rewards, by more than three points. This encourages the use of NAS over a random search within the search space. The models shown in this table were initialized with random values, without pre-training, and the conventional technique was run without any form of data augmentation.

With regard to pre-training the student model, conventional knowledge distillation frameworks employ the use of a pre-trained student model. While pre-training the student model on a generic, masked-language modelling task before distillation helps improve the final performance of the student model after distillation, it puts a hard limitation on the architecture of the model, as only a few pre-trained architectures are openly available. Moreover, it is computationally infeasible to pre-train all the candidate models during the search process, as there is no "proxy set" for this process, and pre-training a single model often takes several days.

Since a purpose of NAS is to find a best architecture for distilling from a given teacher model, the inventors performed the distillation-search process on untrained, randomly initialized models, which is why the accuracies in FIG. 9 lie in the upper 60 s (which is significantly lower than the conventional models that achieve more than 80% accuracy on MNLI tasks). In order to bridge the gap between the inventive student model and conventional techniques, the inventors experimented by pre-training the NAS-selected model to get PretrainedNASModel, and then pass that model through the knowledge distillation process.

To pre-train the NAS-selected models, the inventors used a pre-training procedure similar to the original BERT training, using both training objectives (i.e., masked language modelling and next sentence prediction) in the process. While a separate distillation procedure can be used to generate pretrained models, the inventive approach of method 100 achieves at least two objectives. First, the method isolates the effect of the pre-training procedure, enabling a clear analysis of the effect of NAS in choosing the student model architecture. Secondly, conventional techniques involving distillation provides pre-trained models only for a limited set of BERT configurations and these configurations are not guaranteed to match the model architecture recommended by the KD-guided NAS process.

The experiments use two flavors of pre-training, one using only a first source, and another using both a first source and a second source. Using these in the pre-training process allows for an apples-to-apples comparison of the method 100 and conventional work-BERT was trained using these two datasets employ the use of MiniLM in their distillation process, which itself was distilled from BERT using these two datasets.

When both datasets were used, the two models selected by NAS, $\text{NAS}_{Model1}$ and $\text{NAS}_{Model2}$ were pre-trained for 400,000 steps when using both the first source and the second source and 200,000 steps when using only the first source. The learning rate was tuned on a held-out developer set from the range $2e^{-4}$ to $5e^{-4}$ with a batch-size of 64. The sequence length is set to 512 throughout the entire training period.

FIG. 10 shows the value in pretraining, showing that pretraining with only the first source leads to an 8-10 point increase in accuracy on MNLI. Since it is observed that using both the first source and the second results in superior performance (i.e., an increase of 10-11 points in accuracy), that is the configuration discussed in the following experimental result discussion.

Following the conventional techniques of data augmentation during the fine-tuning phase of a large pre-trained LM, the experiments focus on augmenting the MNLI training set with SNLI. Both these natural language inferencing (NLI) tasks recognize textual entailment by labeling two pairs of sentences as either "entailment," "contradiction" or "neutral." Essentially, this method of dataset expansion more than doubles the training corpus, moving from 390 K training examples of MNLI to 940 K training examples in this combined NLI corpus. This simple data augmentation strategy that does not involve complex synthetic data generation techniques, is shown to be quite effective. FIG. 11 shows that the invention achieves a significant boost of 4 points (approx.) in accuracy over the baseline.

That is, FIG. 11 depicts performance of the inventive model and NAS-distilled architectures on MNLI with different augmentation resources as an unlabeled transfer set with Bert-base as a teacher and pre-trained with self-supervision on the first source and the second source (e.g., parameters in millions).

To fairly compare the utility of the inventive KD-guided NAS to find the best student model for distilling from a BERT teacher, the inventors compared the method 100 results to the architecture used in conventional techniques. The inventors call this model BaseModel, which has 6 hidden layers, 12 attention heads, a hidden size of 384, an intermediate size of 1536 and a rectified activation linear function (i.e., a relu activation function). The inventors evaluated this architecture using the inventive pretraining techniques (e.g., see FIG. 13) to obtain P T BaseModel. These models were then compared with the model chosen by the NAS pipeline, specifically, $\text{NAS}_{Model}$ and $\text{P T NAS}_{Model}$. The results of this comparison is shown in FIG. 12, where it can clearly be seen that NAS models (specifically, pretrained ones) have an advantage over the Base model. As seen in FIGS. 11-12, data augmentation is able further to improve the performance, giving merit to the inventive proposed KD-guided NAS process of method 100.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 14, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 14, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 15:
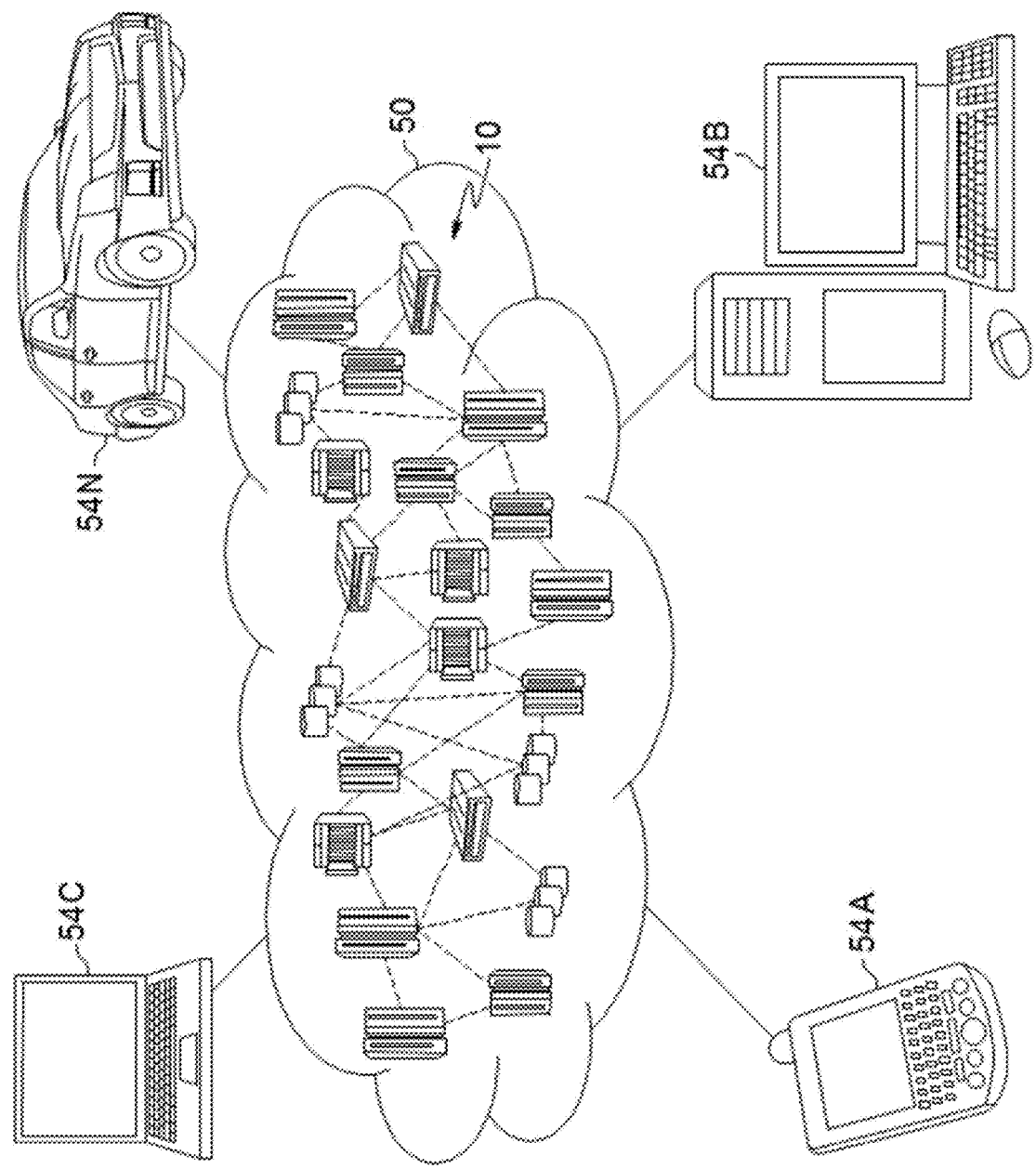
FIG. 15 depicts a cloud computing environment 50 according to an embodiment of the present invention.

Referring now to FIG. 15, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 15 are intended to be illustrative only and that computing nodes 10 and cloud computing environment 50 can communicate with any type of computerized circuit over any type of network and/or network addressable connection (e.g., using a web browser).

Figure 16:
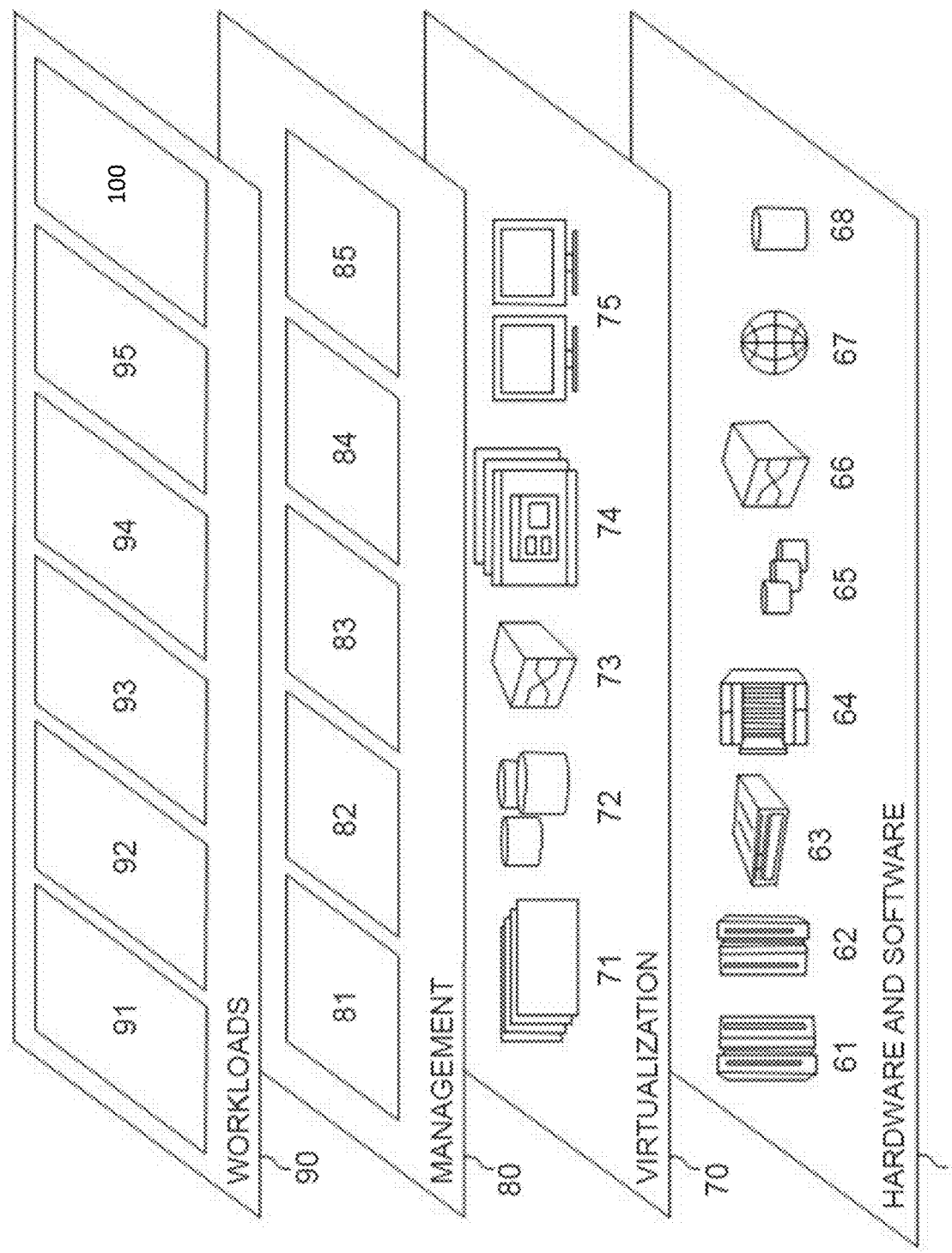
FIG. 16 depicts abstraction model layers according to an embodiment of the present invention.

Referring now to FIG. 16, an exemplary set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the neural architecture search method 100.

The present invention may be a system, a method, and/or a computer program product at any possible technical detail level of integration. The contribution evaluation computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented neural architecture search method, the method comprising:
   accessing, by a computing device, a teacher model;
   utilizing, by the computing device, the teacher model to distill knowledge from a corpus of natural language using knowledge distillation (KD);
   determining, by a computing device, a best fit language model of a plurality of language models for language understanding that is a best fit for interpretation of the corpus of natural language, determining the best fit language model by performing Knowledge Distillation (KD)-guided Neural Architecture Search (NAS) over the plurality of language models, the NAS process using a NAS algorithm including a language model architecture search space, the Knowledge Distillation (KD)-guided Neural Architecture Search (NAS) combining knowledge distillation (KD) of knowledge distilled from the corpus of natural language by the teacher model with estimation of performance of each of the plurality of language models by the Neural Architecture Search (NAS) to select the best fit language model which maximizes accuracy, minimizes latency, optimizes knowledge distillation (KD), and meets a constraint on size to produce a pre-trained student model architecture that outperforms a non-pre-trained randomly initialized student model architecture, the pre-trained student model architecture including knowledge distilled from the teacher model and having less than half of the parameters of the teacher model; and
   interpreting, by the computing device, the corpus of natural language using the pre-trained student model architecture performing language understanding.

2. The computer-implemented neural architecture search method of claim 1, further comprising receiving, by the computing device, access to the corpus of natural language.

3. The computer-implemented neural architecture search method of claim 1, wherein the language model architecture search space is defined to be a set of operations of a language model including deep learning-based models.

4. The computer-implemented neural architecture search method of claim 1, wherein the student model and teacher model share a same set of operations.

5. The computer-implemented neural architecture search method of claim 1, wherein the student model and the teacher model have a different set of operations.

6. The computer-implemented neural architecture search method of claim 1, wherein the teacher model includes a language model, pre-trained on a text corpora.

7. The computer-implemented neural architecture search method of claim 1, wherein the NAS algorithm includes a reward function which includes a weighted combination of an accuracy on the downstream task, the latency and the KD from the teacher model.

8. The computer-implemented neural architecture search method of claim 7, wherein the knowledge is distilled from the teacher model in an unsupervised manner via intermediate features similarity.

9. The computer-implemented neural architecture search method of claim 7, wherein the knowledge is distilled from the teacher model in a supervised manner via logits similarity.

10. The computer-implemented neural architecture search method of claim 7, wherein the knowledge is distilled from the teacher model via a combination of:
    an unsupervised manner via intermediate features similarity; and
    a supervised manner via logits similarity.

11. The computer-implemented neural architecture search method of claim 10, wherein a measure of a similarity between the teacher model and the student model includes a statistical measure of a distance between vectors.

12. The method of claim 1, wherein the neural architecture search method is used to deploy high performing language models in resource-constrained environments.

13. A neural architecture search computer program product, the neural architecture search computer program product comprising a computer-readable storage medium having program instructions embodied therewith, the program instructions executable by a computer to cause the computer to perform a method comprising:
    accessing, by a computing device, a teacher model;
    utilizing, by the computing device, the teacher model to distill knowledge from a corpus of natural language using knowledge distillation;
    determining, by a computing device, a best fit language model of a plurality of language models for language understanding that is a best fit for interpretation of the corpus of natural language, determining the best fit language model by performing Knowledge Distillation (KD)-guided Neural Architecture Search (NAS) over the plurality of language models, the NAS process using a NAS algorithm including a language model architecture search space, the Knowledge Distillation (KD)-guided Neural Architecture Search (NAS) combining knowledge distillation (KD) of knowledge distilled from the corpus of natural language by the teacher model with estimation of performance of each of the plurality of language models by the Neural Architecture Search (NAS) to select the best fit language model which maximizes accuracy, minimizes latency, optimizes knowledge distillation (KD), and meets a constraint on size to produce a pre-trained student model architecture that outperforms a non-pre-trained randomly initialized student model architecture, the pre-trained student model architecture including knowledge distilled from the teacher model and having less than half of the parameters of the teacher model; and
    interpreting, by the computing device, the corpus of natural language using the pre-trained student model architecture performing language understanding.

14. A neural architecture search system, said neural architecture search system comprising:
    a processor; and
    a memory, the memory storing instructions to cause the processor to perform a method comprising:
        accessing, by a computing device, a teacher model;
        utilizing, by the computing device, the teacher model to distill knowledge from a corpus of natural language using knowledge distillation (KD);
        determining, by a computing device, a best fit language model of a plurality of language models that is a best fit for interpretation of the corpus of natural language, determining the best fit language model by performing Knowledge Distillation (KD)-guided Neural Architecture Search (NAS) over the plurality of language models, the NAS process using a language model architecture search space, the Knowledge Distillation (KD)-guided Neural Architecture Search (NAS) combining knowledge distillation (KD) of knowledge distilled from the corpus of natural language by the teacher model with estimation of performance of each of the plurality of language models by the Neural Architecture Search (NAS) to select a best fid model which maximizes accuracy, minimizes latency, optimizes knowledge distillation (KD), and meets a constraint on size to produce a pre-trained student model architecture that outperforms a non-pre-trained randomly initialized student model architecture, the pre-trained student model architecture including knowledge distilled from the teacher model and having less than half of the parameters of the teacher model; and
interpreting, by the computing device, the corpus of natural language using the student model performing language understanding.

\* \* \* \* \*